June 10, 1941.    T. F. LITTLE    2,245,486

SHIPYARD

Filed Sept. 18, 1939    6 Sheets-Sheet 1

Fig. 1.

Inventor
*Thomas F. Little*

Munn, Anderson & Liddy
Attorney

June 10, 1941.                T. F. LITTLE                2,245,486
                                SHIPYARD
                        Filed Sept. 18, 1939            6 Sheets-Sheet 2
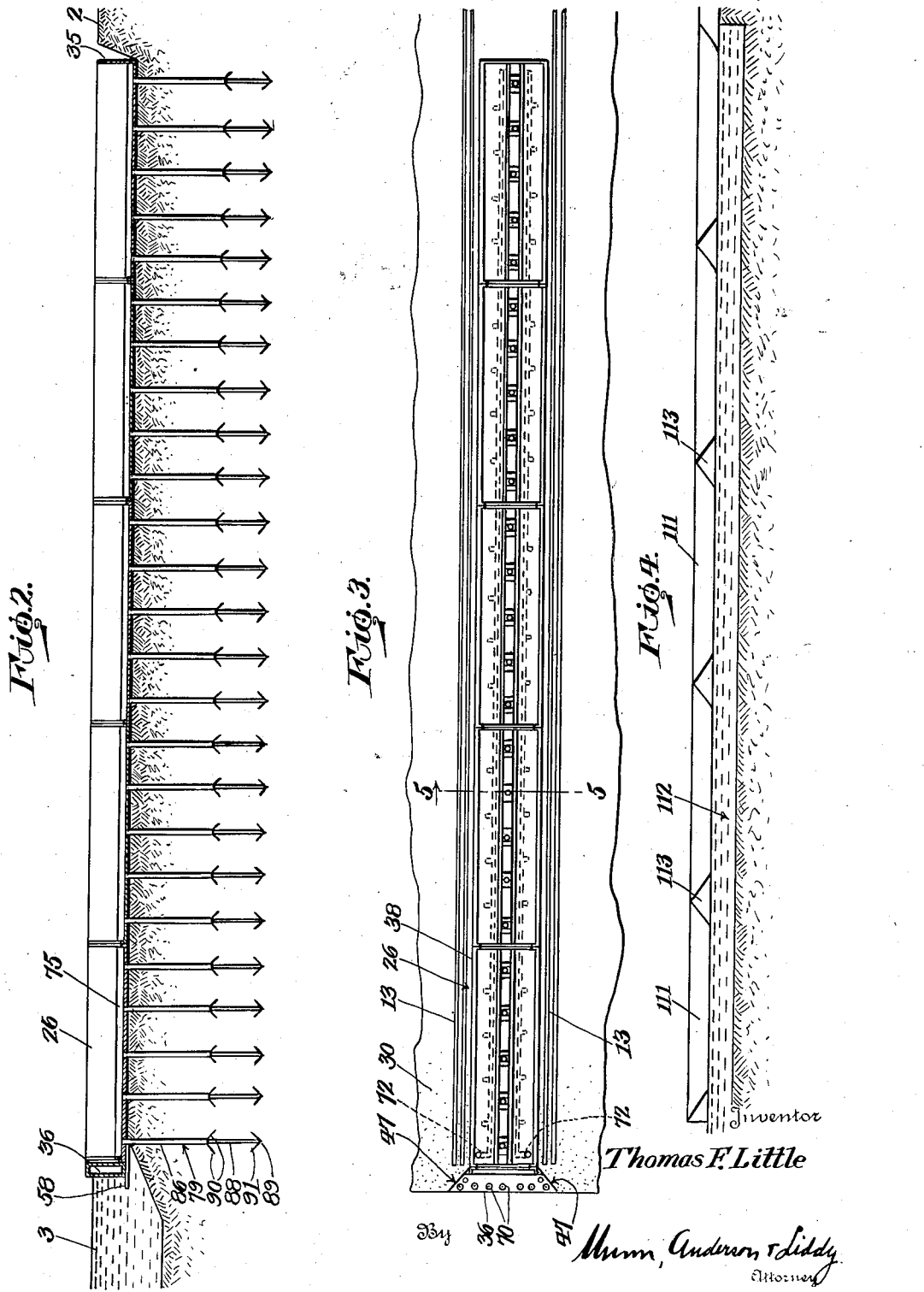

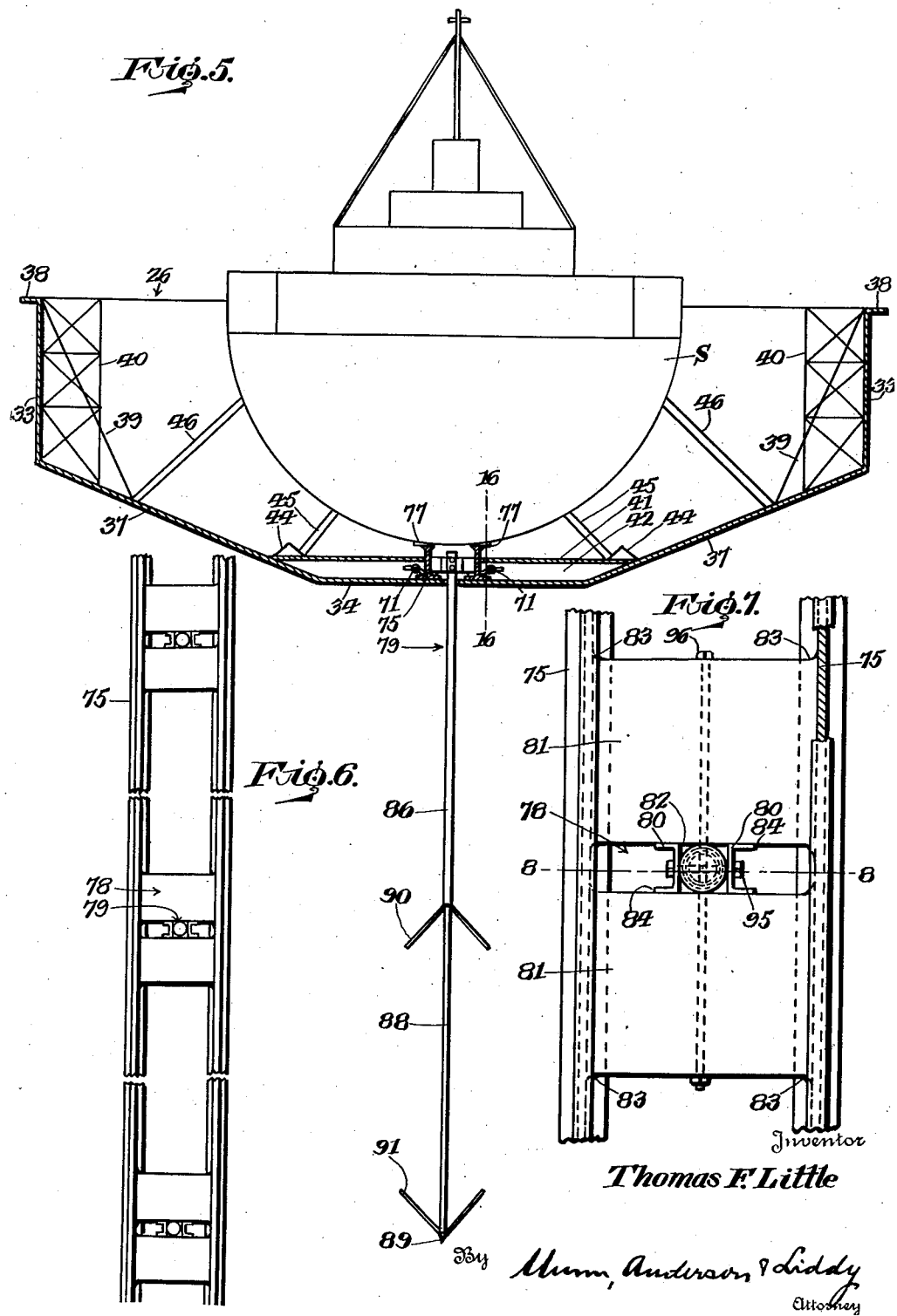

June 10, 1941. T. F. LITTLE 2,245,486
SHIPYARD
Filed Sept. 18, 1939 6 Sheets-Sheet 4
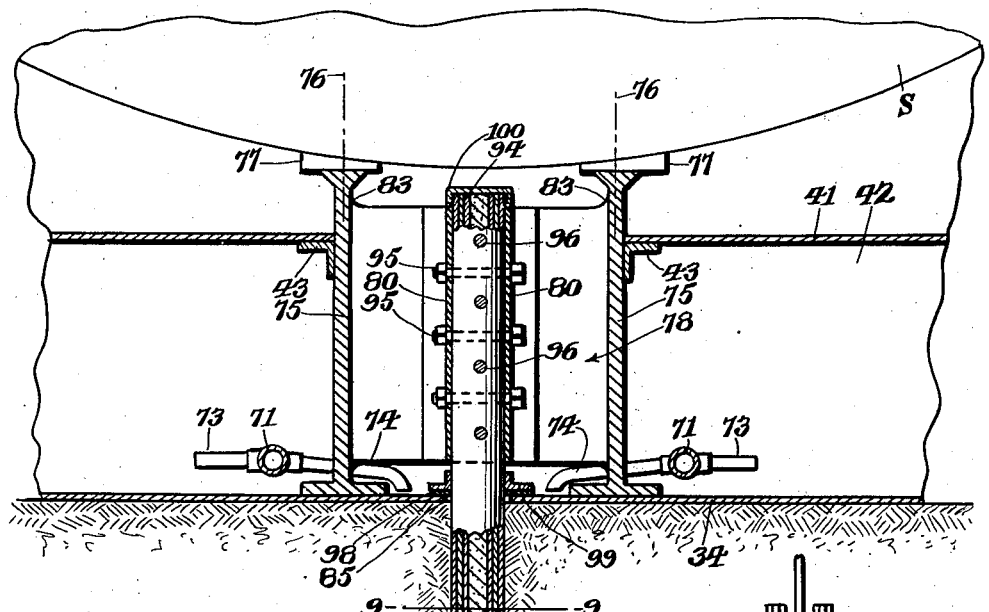
Fig. 8.
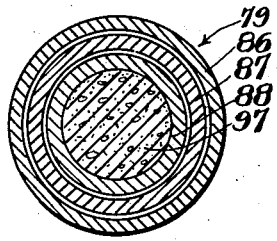
Fig. 9.
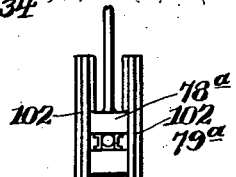
Fig. 11.
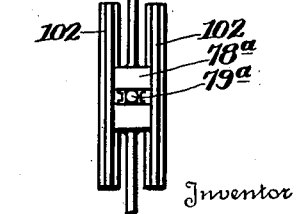
Inventor
Thomas F. Little
Munn, Anderson & Liddy
Attorney

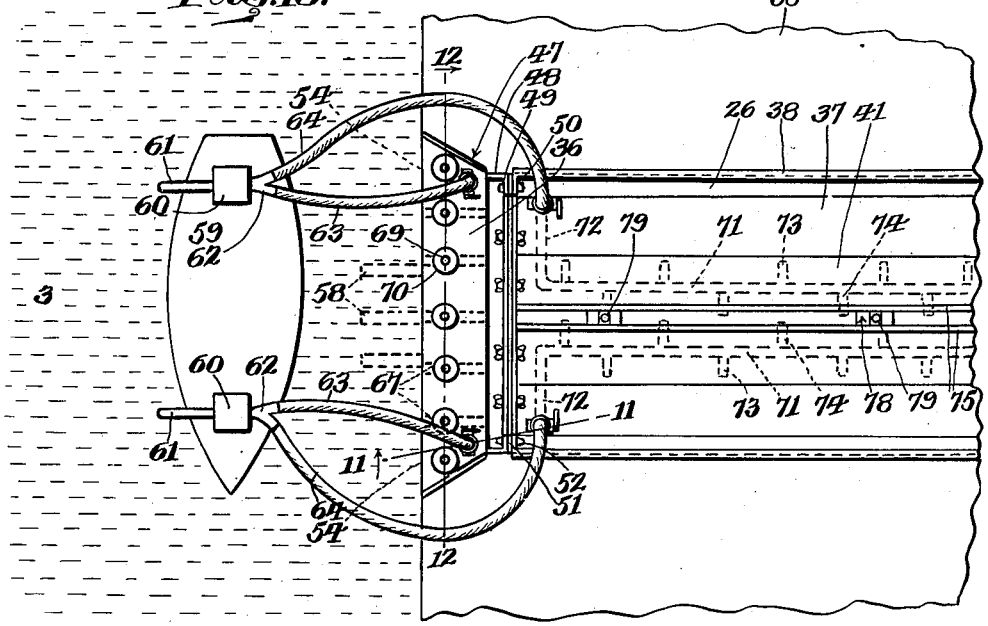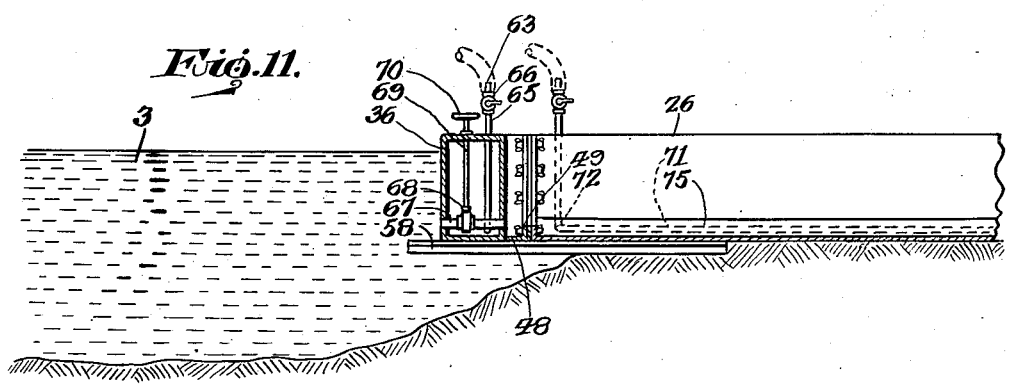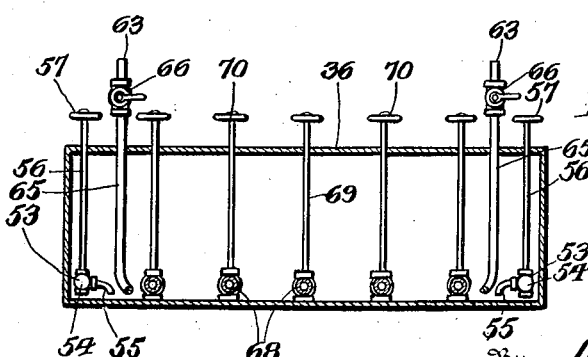

June 10, 1941.  T. F. LITTLE  2,245,486
SHIPYARD
Filed Sept. 18, 1939  6 Sheets-Sheet 6

Inventor
Thomas F. Little
By Munn, Anderson & Liddy
Attorney

Patented June 10, 1941

2,245,486

UNITED STATES PATENT OFFICE 2,245,486

SHIPYARD

Thomas F. Little, Raleigh, N. C.

Application September 18, 1939, Serial No. 295,502

16 Claims. (Cl. 61—64)

This invention relates to an improvement in a shipyard, and the nature of the improvement is such as to expedite the building of ships by carrying on the work in a systematic manner. This initial statement conveys only a remote idea as to what is actually achieved by the invention, but the merit of the latter will be understood more clearly when one first considers the procedure currently carried out in the building of ships.

The practice from time immemorial is to lay down a launching ways and to erect thereon in the course of construction a cradle as a foundation for the hull of the ship. This launching system comprises a necessarily heavy keel support upon which the building is done, supplemented by what is known as a launching cradle with triggers which together with the necessary accesories comprise expensive and complicated machinery which is necessarily figured into the cost of the ship. The launching ways are inclined and pitched toward the water where it is proposed to launch the ship, and this foundation pitch introduces an element of awkwardness into the construction which complicates the calculations in nearly all phases of the ship building as plumb lines cannot be dropped upon slanting foundations.

Moreover, there are instances on record wherein the foregoing launching devices have failed to function. This results in a crashing and rending of the huge timbers which are required to be used for the support of the ship and further results in the inescapable injury and possible death of one or more persons, usually among the workers who are under the ship knocking away at the keelblocks. Ships launched according to the foregoing plan also frequently require the employment of a number of tugs to hold back the ship and prevent its overriding the width of the river, but sometimes these precautions fail to prevent the ship from getting stuck in the opposite bank. Also, it is of record that costly ships have turned turtle and sunk upon hitting the water from these elevated launching ways.

The herein proposed remedy for the foregoing launching practice directly comprises an improved basin. Actually there are a number of the basins, but whether the shipyard embodies one or more of said basins, said shipyard is laid out on a plan which directs all of the functional machinery thereof, so to speak, from the inception of its design at the "front-door" of the shipyard, to the discharge of the ship in its completed form in every detail at the waterfront exit or "back-door" of the shipyard. With this preamble in mind the objects of the invention are as follow:

First, to provide a shipbuilding plant comprising a structural lay-out whereby the building of one or more ships can be carried on in an orderly manner in which the entire effort, both mental as in supervision and manual as in the movement of building materials through the yard will be upon a straight line production basis from the administration building at the entrance to the ship discharge openings at the exit.

Second, to provide a shipyard which comprises a complete and self-contained unit wherein one or more ships can be assembled, beginning at the formulation of the plans and ending at the ultimate fitting out of the ship.

Third, to provide a shipyard wherein the buildings incidental to the functioning of the plant, including the various workshops, are all built up from the yard ground level whereas the ship basin is anchored to and extends up from the submerged harbor floor so that its upper margin is substantially flush with said ground level, this particular phase of the assemblage lending itself to a gravity flow of materials, so to speak, namely to the lowering of said materials into the basin and ship rather than requiring the costly hoisting thereof high above ground level as now used in the old shipbuilding systems.

Fourth, to provide a shipyard wherein one of the important parts comprises the previously mentioned basin, said basin having the distinctions of consisting of a prefabricated metal structure, being lighter in weight as compared with currently known drydocks, and thereby less costly to install, and being as stable because of permanent anchorage to the ground far below the harbor floor on which the basin is seated.

Fifth, to provide a shipyard wherein the foregoing basin serves as an assembly line combining the functions of customarily employed launching ways and fitting-out piers, the usefulness of the basin not being diminished in the least by the flooding and self-launching of the ship because other ships can be built in it repeatedly, and, said basin can also be used for drydocking and repairing between ship buildings.

Sixth, to provide a basin which is primarily a submerged assembly line and launching ways in that it is pinned down permanently to the harbor floor, hence capable of containing water at harbor level when the sea valves and flood gates are opened, thereby permitting the ship to be floated out into the harbor, under its own power if desired, in a fully equipped condition rather than to expose it to the dangers of current methods of launching and the costly delay of subsequent transfer and fitting out.

Seventh, to provide a shipyard which is readily set up at strategic points in any suitable coastal locality, the basin or basins consisting of prefabricated metal parts which are rolled and made ready at the mill, readily transported and adapted to be assembled at the shipyard site, thus providing for rapidity in construction, and, at the same time constructed so as to be easily pinned down to the harbor floor, establishing the solidarity of the basin without having to resort to ponderous and costly concrete, masonry and steel floor, wing and side wall structures which in current dry basin and drydock construction is inserted mainly for holding down purposes against upward hydrodynamic forces. At the same time the basins are pinned down, they are automatically supported upwards.

Eighth, to provide a shipyard wherein the functioning of a drydock or basin is simplified through the use of a tug boat as an auxiliary, the latter being operated only when its pumps are needed in conjunction with the simple system of piping embodied in the basin to empty it of water, thereby avoiding the usually complex and expensive pumping and piping equipment usually seen in installations of this type. The tug boat also serves as motive power for the basin floating gates, moving them in and out of place, and as a shipyard tender for utility service.

Ninth, to provide a ship basin which is light in weight as compared with the foregoing concrete structures, the metal plates being no thicker or stronger than the plates of the standard ships intended to be built therein and designed mainly to meet watertight and water pressure factors, the lightness of said basin being compensated for by so anchoring it to the harbor floor as to both hold the basin and its superimposed weight up from sinking, as well as to hold the basin down from floating.

Other objects and advantages will appear in the following specification reference being had to the accompanying drawings in which Figure 1 is a diagrammatic plan view of a shipyard laid out in accordance with the invention.

Figure 2 is a longitudinal section of one of the basins taken substantially on the line 2—2 of Figure 1 but showing the respective floating gate in the closed position.

Figure 3 is a detail plan view of the basins illustrated in Figure 2.

Figure 4 is a side elevation of one set of launching berths as seen if viewed on the line 4—4 of Figure 1.

Figure 5 is a cross section of one of the basins taken substantially on the line 5—5 of Figure 3.

Figure 6 is a detail plan view of a portion of the keel rails of said basins.

Figure 7 is an enlarged detail of the coupling between the basins and one of the anchor pins.

Figure 8 is a detail enlarged cross section taken on the line 8—8 of Figure 7, illustrating the coupling and anchor pin more clearly.

Figure 9 is a cross section taken on the line 9—9 of Figure 8.

Figure 10 is a detail plan view of a portion of one of the basins, illustrating one of the functions of the auxiliary tug in pumping out the water from the floating gate and basins.

Figure 11 is a section taken substantially on the line 11—11 of Figure 10.

Figure 12 is a cross section of the floating gate taken substantially on the line 12—12 of Figure 10.

Figure 17 is a detail plan view of a modified form of keel rail.

Figure 13:
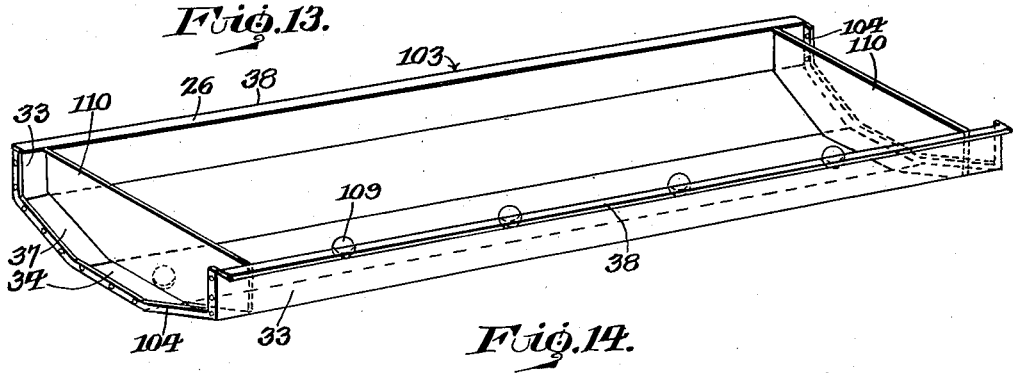
Figure 13 is a perspective view of one of the basins sections illustrating the use of a temporary bulkhead for closing the ends of the section preparatory to floating it in position.

Attention is first directed to Figure 1 which, as previously indicated, diagrammatically represents the improved layout. This is a straight-line layout, meaning that the various buildings, shops, lay-out lots, deep water slips, basins and railway sidings are so oriented as to enable the highspeed handling of materials going into the construction of or repair of ships. The shipyard 1 is located at any suitable coastal locality which meets the requirements of a sufficiently large expanse of land 2 adjacent to a water channel 3. That portion of the shore which is utilized for the purposes of the shipyard is indented at 4 to comprise what is herein known as the harbor.

A main highway 5 is situated parallel to the shore line, or substantially so. One or more administration buildings 6 are fronted upon said highway. Two such buildings are employed in the present layout, these being separated by an alley 7 the entrance to which is adapted to be closed by gates 8. A yard superintendent will occupy a house 9 which is situated more or less directly in said alley so that the going in and out of the workers, loadings of material and the like can be held under constant surveillance. The buildings 6 are backed by storage houses 10 in which materials are stored pending their being checked out.

It is observed in Figure 1 that the yard superintendent supposedly in the house 9 can observe with equal facility the passage of persons through the alley 7 and the receipt of materials in a receiving yard 11 in back of the storage houses 10. One or more sets of railway tracks 12 traverse the yard 11 in the crosswise direction but in parallelism to the storage houses. These tracks go off to a main line in any common way. A number of sidings 13 branch off from the tracks 12, the major portions of which are all parallel and at right angles to the tracks 12.

Said sidings pass between a series of shops 14. This series extends crosswise of the shipyard and parallel to the tracks 12. They vary in size according to the nature of the work that is intended to go on therein. A good arrangement of the shops, reading upwards from the bottom of Figure 1 is as follows: 15 a pattern shop, 16 a model shop together with facilities for tools and a mold loft, 17 an electrical shop, 18 a second model shop together with facilities for tools and a mold loft, 19 a combined plate and blacksmith shop together with a foundry, 20 a third model shop together with facilities for tools and a mold loft, 21 a machine shop, 22 a fourth model shop together with facilities for tools and a mold loft, and finally 23 a paint shop. This series of shops is supplemented by others designated 24 and 25 at the respective ends of the series, these being of any preferred character to suit the berths which they head.

It will be understood from the fact that there are four combined model and mold loft shops 16, 18, 20 and 22 that the present shipyard comprises four ship basins.

There is one of the foregoing shops at the head of each of the basins, and for the purpose of distinguishing the latter they are designated 26, 27, 28 and 29. These basins are situated longitudinally of the shipyard 1. They are located in the harbor 4 and they jut out from the shore or pier line into the channel 3 to any needed extent so as to enable direct water communication between any one or more of the basins and the channel for the purpose of an ultimate launching. The railway sidings 13 extend along the various basins. This arrangement is one of the utmost convenience and it is a direct contribution toward the previously mentioned straight-line layout of the yard.

In practice each basin of the group is quite long. A preferred proportion is to make each basin 2,500 feet long by 150 feet wide and approximately 40 feet deep. These dimensions are given only as an example, and it should be understood that they may be varied as much as desired to meet any specific requirement. Said basins are spaced fairly wide apart, the distance therebetween being approximately 300 feet. These spaces are now designated 30, 31, 32 and they comprise material layout lots. It seems unnecessary to attempt to detail the nature of these lots other than to state that they will be made to accommodate necessary equipment sheds, work benches, prefabricated materials, assembly platforms and in short, any type of equipment which is necessary to the speedy assembly of one or more ships in a line.

The foregoing length of the basins makes it evident that several ships can be under construction simultaneously in each of the basins. Thus when the railway cars are run down the sidings 13 they can be made to drop off duplicate pieces of a specific type of equipment at each of the building positions so that the erection of each ship can be regulated much on the order of a construction line in an automobile assembling plant. This plan of construction is facilitated by having the ship basins flush with the surfaces of the intervening layout lots. The materials are thus lowered into the ship during construction in contrast to the customary and costly mode of raising the materials high into the air to reach the various parts of the ship during erection.

This mass production depends first on the specific layout of the shipyard itself, second, upon the specific nature of each of the ship basins. Inasmuch as each of these is alike in construction the following description is confined to the basin 26. This basin comprises a long metal shell having upright side walls 33 and a bottom 34 (Fig. 5) as well as a head 35 on the land end (Fig. 2) and a gate 36 on the channel end. Said statement that the basin comprises a metal shell is to be taken in an illustrative sense and not as a limitation, because in actual practice it can be built, and quite effectively at that, of a combination of metal and concrete, or mainly concrete, and also of wood or a combination of wood and concrete. The combinations in this respect are subject to considerable variation, but the ultimate effect of any of them is a shell which is distinguished from any known dry dock construction by being relatively thin. If the metal shall on which this description is predicated, is found to need reinforcement after its initial construction, such reinforcement, whether of any of the combinations suggested, can be added, and all is to be regarded as within the spirit of the invention. The bottom preferably has upwardly pitched portions 37 (Fig. 5), but in practice said bottom can be perfectly flat straight across to join the side walls 33 at right angles. The tops of the side walls 33 may be and preferably are flanged at 38 to tie in with the surfaces of the adjacent layout lots. Any preferred system of bracing 39 may be embodied to strengthen the basin shell, the nature of the bracing permissibly being so variable that no attempt is made herein to disclose its details excepting to suggest it at 39 in Figure 5.

The basin 26 embodies demountable steel scaffolds 40 (Fig. 5). These scaffolds containing elevators are a material aid to the handling of materials in building the ship S. They may be as large as required, and as in the instance of the bracing 39 no attempt is made to disclose the details because these can be of any common construction. The bottom 34 has a superimposed floor 41 (Fig. 5) which is desirably spaced in the vertical direction to define a bilge or double-bottom 42. The floor 41 which defines this space is preferably of the removable hatch cover type. In other words, it consists of a system of plates or floorboards which stay in place because of their weight, and when they are in place they rest upon brackets 43 (Fig. 8) and such other supports as may be afforded.

The connecting points between the floor 41 and the pitched portions 37 of the bottom 34 (Fig. 5) denote the positions of the ship bracing blocks 44 against which some of the shoring timbers 45 are abutted to support the hull. Said blocks 44 are not necessarily located exactly as stated or shown, but may be situated elsewhere upon the bottom of the ship basin. The advantage of emplacing the blocks on the floor 41 at the outside extremities is to impose the pressure of the weight of the ship on the reinforced portions of the floor brackets.

Supplemental shoring 46 (Fig. 5) is used to support the ship as its erection progresses. The gate 36 (Figs. 2 and 10), is adapted to close a potential opening 47 on the channel end of the basin. This opening is desirably flared outwardly, and the sides of the gate are bevelled to match. The pressure of the water against the outside of the gate thus becomes a material factor in sealing the joint at 47 thus to maintain the basins in a dry state. However, sole reliance is not put upon the water pressure for this function because of the necessity of keeping the water out of the basin during the ship construction period. Any seepage, however, will gravitate to the bilge where it may be conveniently removed. Suitable locking means for the gate are employed, and one preferred type comprises an extension 48 from the side and bottom portions of the small end of the gate (Figs. 10 and 11) which is flanged at 49 to abut a corresponding flange 50 on the contiguous end of the basin 26.

The use of heavy rubber gaskets in conjunction with the flanges insures a water tight joint, the illustration here being confined to a single gasket 51 between the flanges. The latter are bolted together at 52, the bolting being removable when the time arrives for floating the finished ship out of the basin 26, said bolts being removed preparatory to floating the gate to one side.

From this last statement it will be understood that the gate is buoyant. This buoyancy is achieved by making the gate hollow (Figs. 11 and 12). It is sufficiently broad across its narrowest dimension to insure its stability when floated in the channel. The buoyancy of the gate is controlled by one or more sea or gate valves 53 (Fig. 12). Each of these valves has a water inlet 54 in communication with the channel and a water inlet 55 (Fig. 12) in communication with the inside of the gate. Each valve is operable by a stem 56, surmounted by a hand wheel 57. By opening these valves the gate 36 can be sunk the required depth to accurately match the basin opening 47.

This matching is facilitated by the provision of a plurality of projecting rails 58 which are firmly fastened in some appropriate way beneath the basin 26, leaving adequate portions thereof jutting out into the channel well beyond the basin opening 47. The gate 36 is first floated into position above the rail extensions and is then sunk by flooding. When the gate comes to rest upon the rails it is slid in to its closing position by using a tug boat 59 (Fig. 10). This tug boat has been referred to heretofore as an auxiliary to the shipyard, its use making it possible to materially reduce the cost of basin construction because it eliminates all of the customarily elaborate system of gate machinery, pumps, power units, valves, controls, etc., in dry basin construction.

While on the subject of the tug boat 59 note is made that the latter carries one or more pumps 60 (Fig. 10). These are driven by machinery aboard the boat and they have discharge pipes 61 directed into the channel. Each pump has an intake 62, and in practice this intake has separate branches. Two branches for each intake 62 are shown in this instance, one having a hose 63 coupled to it and leading off to the gate 36, the other having a hose 64 coupled to it and leading off to the basin 26.

Each of the hoses 63 is connected to a standpipe 65 (Fig. 12) which is a part of the permanent equipment of the gate 36. Each standpipe has a valve 66 although a valve is not always necessary. The operation of the pumps 60 will draw off the water from the gate 36 to render it buoyant preparatory to floating it away from the opening 47.

Preparatory to doing this it is intended to flood the basin 26. The completed ship is thus ready to be floated out of the basin into the channel 3 when the opening 47 is cleared. The flooding of the basin is accomplished by a plurality of cross pipes 67 embodied in the gate 36 (Fig. 11) each of these pipes being controlled by a sea valve 68 (Fig. 12) which is operable through a stem 69 and handle 70. The opening of the sea valve 68 lets the channel water into the basin 26 thereby floating the ship.

As a preliminary to the building of a ship it is necessary to drain the basin 26 of water which it necessarily contains because of factors described below. It is then that the pumps 60 (Fig. 10) operate through the hoses 64. These are coupled to a pair of horizontal pipe lines 71. These lines comprise fairly large rigid pipes which are screwed together at intervals to compose continuous lines at the sides of the longitudinal center of the ship basin 26. In Figure 10 these pipe lines are shown to include laterals 72 with which the actual coupling of the hoses 64 is done. But these laterals are not essential, nor is it important how the hoses 64 are connected with the pipe lines, the only requirement being to make some connection of the pumps 60 with the space along the bottom of the basin 26 to enable pumping the basin dry when the time comes.

To the latter end the pipe lines 71 have diversely directed inlets 73, 74 (Fig. 8). The water is drawn in through them. The inlets 74 are preferably directed down close to the bottom 34 to insure abstracting all of the bilge water.

It is observed in Figure 8 that the inlets 74 go through the webs of a pair of keel rails 75. The keel rail, whether considered in singular or plural terms, constitutes the midrib or back bone, so to speak, of the basin 26. The latter is merely a metal shell or trough, and being such it is relatively light. The shell could also be made of concrete or wood and still come within the intended category. Any fragility which could be inferred from its structural characteristic is totally overcome by the keel rail because this is made so heavy and rigid as to prevent vertical and horizontal deflection and that when pinned down to the harbor bottom as it is there is no chance of any perceptible deviation of the basin away from a true horizontal line.

The keel rails 75, now considering these in their plural form (Fig. 8), are spaced a requisite distance apart to afford two parallel and longitudinal lines 76 of support for the hull of the ship S (Fig. 8). Wooden chocks or rubber pads 77 are desirably interposed. The necessity for the inwardly directed inlets 74 is now apparent because in pumping the basin dry it is desirable to dry the space between the keel rails 75 as well.

Said rails are connected by heavy duty cross couplings 78 (Figs. 7 and 8). These couplings not only space the keel rails 75 but they also join the keel rails to each of a plurality of anchor pins 79. Each coupling 78 consists of a pair of upright channels 80 (Fig. 7). The webs of these channels are placed back to back in spaced relationship. The webs of the channels are suitably secured to adjacent blocks 81. The result is a pocket 82 (Fig. 7) in which the upper ends of the respective anchor pins 79 are closely fitted.

At this point it is desired to state that the anchor pins 79 are not necessarily confined to use in a single row (Fig. 5). It is stated earlier in this description that the basin can be perfectly flat straight across instead of embodying the upwardly pitched portions 37. Or, by way of variation, said pitched portions can be confined substantially to a mere abbreviation of the corners of an otherwise cross sectionally rectangular basin.

In any event it would be desirable and strictly within the purview of this invention to utilize other longitudinal rows of anchor pins 79. The wisdom of embodying such additional rows is derived from the fact that a much stronger foundation is produced. The added under-pinning acquires its hold on the ground along lines longitudinally of the basin parallel to the central row of anchor pins 79, depicted in Fig. 5, thus insuring that the basin will neither sink nor float, and that there will be no chance of the side walls closing in toward each other even to the slightest degree by virtue of any buckling that could be made to occur along the bottom because of the superimposed weight upon the keel rails.

The mentioning of the latter carries with it the obvious necessity of using other lines of keel rails because it is from these lines of keel rails that the anchor pins are driven. It is readily understood from the foregoing description that if and when plural rows of anchor pins 79 are employed there will be equal plural rows of rails, and that these will be tied together by coupling blocks so as to form a perfectly rigid framing on the bottom of the basin that will prevent any tendency whatsoever of buckling.

The blocks 81 are desirably massive. Their bulk is a contribution toward the rigidity of the keel rails. The blocks are secured to the latter in any known way, preferably by welds 83 around all accessible joints. The result is an integral formation of the blocks 81 with the keel rails 75. On the same principle the flanges of the channels 80 are welded at 84 (Fig. 7) to the blocks 81.

There is a series of manholes 85 along the longitudinal center of the ship basin 26. One of these holes is shown in Figure 8. Each pocket 82 (Fig. 7) is in accurate alinement with the respective manhole 85. This is necessary for the driving through of the anchor pin 79. The latter is in the nature of a tubular steel pile, and it is driven sufficiently far into the ground beneath the ship basin 26 and below the harbor floor to both hold the basin down against floating when empty, and up against sinking when loaded. The collective effect of the anchor pins is well illustrated in Figure 2.

The pin 79 consists of a series of telescoped steel tubings 86, 87 and 88 each of which may be welded or coupled in length to any desired depths. Of these tubings 86 and 87 are approximately the same in length (Fig. 8), but the tubing 88 is much longer than either. The tubing 88 preferably has a spear head 89. Each of the tubings 87, 88 has a dead-man anchorage of the toggle type. The wings 90, 91 of the respective anchorage are hinged to the tubes 87, 88 at 92, 93.

The various tubings are in telescope relationship preparatory to the emplacement of the anchor pin 79. The various tubings are then driven into the ground to a greater or less extent as is necessary to achieve the relationship depicted in Figure 8. The tubing 86 is driven a predetermined distance and then held temporarily. The tubing 88 is driven farthest, but may then be drawn back to spread the wings 91 for the upward flare as shown or a modified form of tubing 88 may be used with shorter multiple wings to provide bracing against upward hydrodynamic forces. In driving the intermediate tubing 87 the wings 90 begin to flare downwardly as soon as they depart beyond the bottom rim of the stationary tubing 86. The result of the diversely directed wings 90, 91 is a two-way anchorage. The wings 91 prevent rising of the basin and the wings 90 prevent its sinking.

Preparatory to cutting all of the tubings off level at the top as at 94 (Fig. 8) bolts 95 are driven crosswise through the channels 80 and the uppermost portion of the anchor pin 79 (Figs. 7 and 8), while other and much longer bolts 96 are driven longitudinally through the blocks 81 and the upper portion of the anchor pin at points intermediately of the bolts 95. It is thus that the keel rails 75 are firmly attached to each of the anchor pins 79. In order to add vertical ballast and make the latter even more secure the inner tubings 88 are loaded with concrete 97 (Fig. 8), which may be conveniently poured in the usual manner.

A water-tight gasket 98 (Fig. 8) is fitted around the anchor pin 79 above the manhole 85. This is held down by a collar 99 on the outer tubing 86 of the anchor pin. The flange of the collar is bolted to the floor 34. The collar has a fairly tight fit around the tubing 86 to begin with, and when the bolting is done the expansion of the gasket will produce a tight seal in the manhole. After the cutting is done at 94 the anchor pin 79 is capped at 100. This cap largely is for the purpose of producing a desirable finish.

While on the subject of the keel rail 75 attention is directed to Figure 17 which illustrates a modification. The keel rail 75a now appears in singular form, consisting of a single, central rail line 101 which, obviously would be composed of a number of suitably jointed sections. The advantage of this arrangement is that much less material is required to compose the midrib than according to the arrangement in Figure 8. But inasmuch as the twin keel rails of Figure 8 serve the purpose of supporting the hull at spaced points (lines 76, Fig. 8), that advantage is preserved by flanking the rail line 101 with twin rail sections 102 (Fig. 17). These sections are spaced fairly far apart in the longitudinal direction, yet they are close enough to adequately support the hull. They are connected together and to the rail line 101 by couplings 78a similar to 78 (Fig. 8). These couplings 78a also provide the anchorages for the pendant pins 79a.

Further reference is now made to the specific construction of the ship basin 26. Because of the great length of this basin it is obviously not feasible to handle it as a unit. It is preliminarily made of sections such as 103 (Fig. 13). This section, in accordance with the plan as herein outlined, is approximately 500 feet long. It has been indicated already that metal, concrete or wood may be employed, but metal is preferred. The ends of the section are flanged at 104. These flanges are directed inwardly (Figs. 14 and 15) because they must be accessible from the inside when connecting the sections in basin form.

A rubber or similar gasket 105 (Fig. 15) is fitted between the flanges. Bolts 106 go through registering holes in the flanges and gasket. Wing nuts 107 are screwed on to the ends of the bolts for the necessary clamping action, and cotter pins 108 or their equivalents are inserted through the ends of the bolts to keep the nuts from unscrewing.

Figure 14:
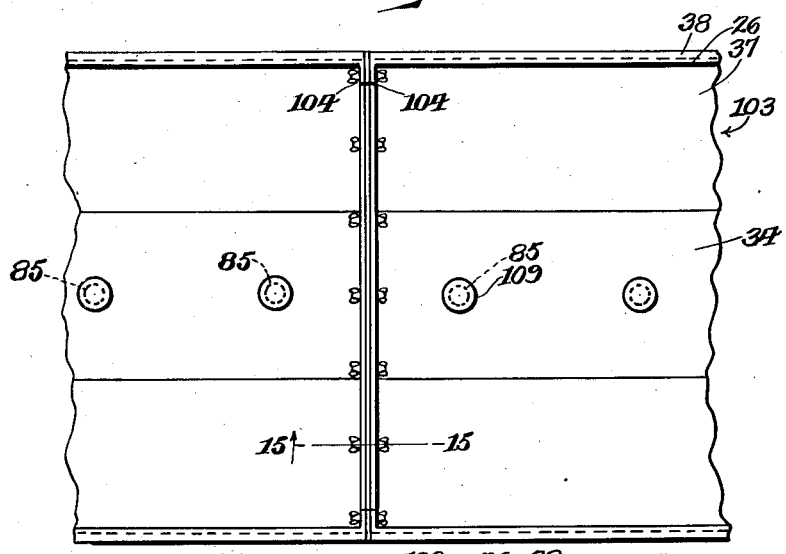
Figure 14 is a detail plan view of portions of a pair of adjoining basin sections particularly illustrating the joint.
Figure 15:
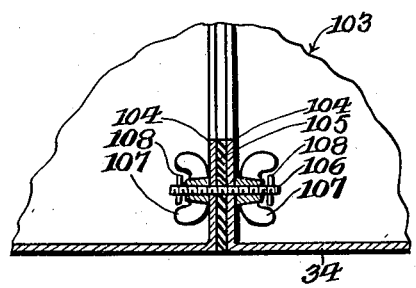
Figure 15 is a cross section taken on the line 15—15 of Figure 14.
Figure 16:
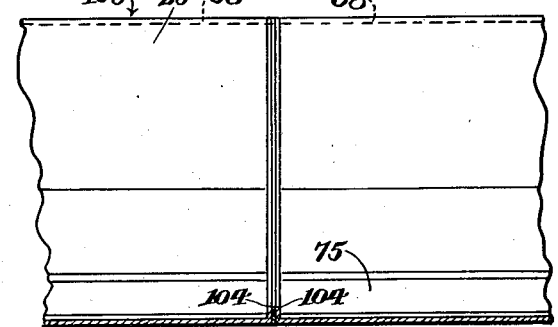
Figure 16 is a longitudinal section taken substantially on the line 16—16 of Figure 5.

The previously mentioned manholes 85 are again shown in Figure 14. These manholes are temporarily capped or plugged at 109 to make the respective section water-tight when temporarily closed by bulkheads 110 at its ends (Fig. 13). This reference to the bulkheads reverts the description to Figures 1 and 4 which illustrates a multiple arrangement of side launching berths 111. These launching berths are placed at the far sides of the basin assemblage, and accessible to the adjacent deep water slips 112 which form parts of the harbor 4. In addition to use in assembling the basins, these side launching ways may be used for multiple shipbuilding.

These berths are separated by partitions 113 (Figs. 1 and 4) which may be pyramidal as shown or of some other desired configuration. These berths are open to the water from the sides, and one of their purposes is to afford places for the assembly of the sections 103.

As these sections are assembled they are shoved off sidewise into the slips 112 and are towed around into the ultimate basin position. The bulkheads 110 are obviously necessary to make the sections seaworthy. As the sections are moved into their basin positions they are bolted together at the flanges 104 while remaining floating. As succeeding sections are manufactured, towed around and bolted together, the small amount of water between the bulkheads is removed, whereupon some of the bulkheads can be taken out and used again in others of the sections yet to be manufactured. The result will be an eventual dry trough, and when the basin is completed to comprise this form, being closed at the land end by the permanent head 35 and by a temporary bulkhead on the channel end the keel rails and pump lines of each section are connected. The basin is thus made perfectly straight and rigid. The watertight floating gate is then attached and the temporary bulkhead on the channel end is removed. At the appointed time a number of the caps or plugs 109 will be simultaneously removed to let in sea water to settle the basin to the floor of the harbor. The gate is then conveniently removed allowing access to the basin by a floating pile driver and barges with steel tubings for underpinning.

The driving of the anchor pins 79 then begins. All of these may be driven before replacing the gate and pumping out the basin, or only so many as it is thought will hold the basin from floating when pumped dry. In any event the anchor pins 79 both support the basin from further settling downwards, and from floating upwards because of the hydrodynamic forces beneath the basin. The preferred way would be to drive all of the anchor pins while the basin is still flooded thereby avoiding the problem of spurting water when the previously unoccupied manholes 85 are uncapped for the driving in of the tubing. The basin is finally pumped dry and any additional installations desired, such as conduit for electric outlets can then be made in perfect freedom. The floating gate 36 is re-emplaced after the basin is cleared of floats, preparatory to pumping dry, following which the steel tubings are cut and capped, and the basin is ready for use.

The foregoing description which relates to the mode of fabricating the sections 103 (Fig. 13) and transporting them to their ultimate basin assemblage makes it clear that this invention also involves a method. This method is useful from the standpoint of the immensely large parts necessarily handled to form a dry basin. Inasmuch as each of these dry basins is nearly a mile long and is required to be anchored to the harbor floor approximately 30 or 40 feet below water level it is readily seen that if common methods were used the usual extremely costly construction of dry docks would be involved, whereas here we have a method which consists of a relatively simple plan of fabrication, assemblage, floating, moving and sinking in order of the successive stages as outlined.

It is a matter of utmost convenience to make up each of the sections in one of the berths 111, to temporarily head it, push it over board and move it into the basin position like a scow. It is also a relatively easy matter to bolt the sections together, and to couple the reinforcing midrib, whereupon the rigid assemblage is sunk, pinned down and pumped dry. This method lends itself to a very rapid construction of a ship basin, and when the latter has served its purpose in the building of the first ship or ships it can be used time and time again in the building and servicing of other ships without the addition of any equipment whatsoever and can also be used for general docking and similar purposes while not actually accommodating ships under construction or repair.

I claim:

1. A shipyard comprising a prescribed area consisting of a normal land level and an adjoining water channel bottomed by an extension of the land, a ship basin consisting of a relatively thin and consequently relatively light shell of trough formation, and an anchorage secured to the basin and driven into said bottom to support the basin marginally flush with the land level, said anchorage embodying means holding the basin down in the water from rising when empty and up from sinking into the bottom when loaded.

2. A shipyard comprising a prescribed area consisting of a normal land level and an adjoining water channel bottomed by an extension of the land, a ship basin consisting of a relatively thin and consequently relatively light shell of trough formation, and an anchorage secured to the basin to depend therefrom, being driven into said bottom to support the basin marginally flush with the land level, said anchorage having a two-way action reacting against the land both up and down to resist floating and sinking of the basin respectively when empty and loaded.

3. In a shipyard, a basin adapted to rest upon a submerged bottom so that a substantial portion of the basin is located below water level, anchoring pins connected to the basin and extending therefrom into the substance of the bottom, and means extending outwardly from the sides of the pins to resist the departure of the basin from its resting position both up and down.

4. In a shipyard, a basin adapted to rest upon a submerged bottom so that a substantial portion of the basin is located below water level, said basin comprising a long, narrow and thin shell, a structure extending longitudinally of the basin and intimately combined therewith to make the basin rigid against deflection out of a straight line both vertically and horizontally, and a series of anchoring pins connected to said structure and extending into the substance of the bottom, said pins having flaring wings laterally thereof resisting both sinking and floating of the basin.

5. In a shipyard, a basin adapted to rest upon a submerged bottom, said basin comprising a long, narrow and thin shell, a heavy structure integral with the basin, extending longitudinally and centrally thereof to provide a ship keel support and to constitute a reinforcing midrib to hold the basin rigid against deflection out of a straight line both vertically and horizontally, and a series of anchoring pins connected to said structure and extending into the substance of the bottom, said pins having lateral wings.

6. In a shipyard, a basin adapted to rest upon a submerged bottom, said basin comprising a long, narrow and thin shell, a system of heavy rails integral with the bottom of the basin and both longitudinally and centrally thereof to constitute a reinforcing midrib to hold the basin rigid against vertical and horizontal deflection, and a series of anchor pins connected to said rail system and extending into the substance of the submerged bottom, said pins having lateral wings.

7. In a shipyard, a basin adapted to rest upon a submerged bottom, said basin comprising a long, narrow and thin shell, a pair of heavy, laterally spaced rails made integral with the bottom of the basin and extending longitudinally and centrally thereof to reinforce the basin against vertical and horizontal deflection, cross couplings connecting the rails to maintain their spacing, and a series of anchor pins pendant from said couplings and extending into the substance of said submerged bottom, said pins having lateral wings.

8. In a shipyard, a prefabricated and consequently primarily floatable ship basin adapted to be sunk and rested upon a submerged bottom so that a substantial portion of the basin is located below a water level, one end of the basin being permanently headed, the other end of the basin having a potential opening with outwardly flared sides, and a fundamentally separate bouyant gate having beveled parts to match the flares, being securable in said opening thus making a tight joint directly by virtue of external water pressure against the gate when the basin is pumped dry, and means connecting the gate and basin to secure the gate in its closing position and prevent an inadvertent disruption of the joint.

9. The method of making a ship basin consisting of fabricating and assembling a plurality of trough-like sections and closing the ends of the troughs so as to make them seaworthy, floating said sections into a basin position and securing the sections end to end to form a basin, strengthening the basin so as to make it rigid, sinking the basin and securing it to a harbor floor, and pumping out the basin so as to make it dry preparatory to building a ship.

10. In a shipyard, a basin adapted to rest upon a submerged bottom so that a substantial portion of the basin is located below water level, said basin comprising a long narrow and thin shell, a ship keel support constituting a reinforcing midrib, said support consisting of a central line of connected rails and groups of rail sections at intervals along said rail, means coupling said sections and rails together, and anchoring pins driven through at the couplings into the substance of the bottom.

11. In a shipyard, a ship basin comprising a relatively thin shell of trough formation, and a center line anchorage system consisting of a midrib structure integral with said shell and extending longitudinally and centrally thereof in simulation of a ship keel thus to make the shell rigid fore and aft, and including anchoring pins integral at one end with the midrib structure to extend into a foundation surface upon which the basin is adapted to rest.

12. In a shipyard, a ship basin consisting of a relatively thin shell of trough formation, a longitudinally central midrib structure integral with and upstanding from the bottom of the shell thereby making the shell rigid fore and aft and serving as a ship keel support, and a system of tubular piles affixed to and extending down and out from said midrib structure and therefore confined to a relatively narrow zone extending longitudinally of the shell and constituting a center line anchorage.

13. In a shipyard, a ship basin consisting of a shell of trough formation, and an anchorage consisting of at least one pin secured to and extending out from the basin into an encompassing volume of solid material in which the basin is adapted to be set, and wings carried by the pin, having one of their ends movably attached to the pin and their other and free ends in confronting relationship to provide for the diverse spreading of said wings in reference to the axis of the pin.

14. In a shipyard, a ship basin consisting of a shell of trough formation including a floor, a rib system fixedly secured on top of the floor thus being superimposed upon the floor, and anchoring pins coupled to the rib system, extending outwardly from said rib system and through the shell into the surrounding material in which the basin is adapted to be set.

15. In a shipyard, a ship basin consisting of a shell of trough formation, a center line construction establishing a predominating midrib effect longitudinally of said basin, said construction comprising a laterally spaced pair of rails affixed to the bottom of the basin and providing a ship-keel support, a longitudinal line of piping embodied in said center line construction and disposed adjacent to one of the rails, and laterals branching from the pipe line, having their intake ends situated in the space between the rails and close to the basin bottom.

16. In a shipyard, a basin adapted to rest upon a submerged bottom, said basin comprising a long, narrow and thin shell, a ship keel support constituting a reinforcing midrib, said support consisting of a central line of connected rails, groups of rail sections at intervals along said rail forming the nucleus of a cross rib system, means coupling said sections and rails into a homogeneous framing, and anchoring pins driven through at the couplings into said bottom.

THOMAS F. LITTLE.